United States Patent Office 2,839,816
Patented June 24, 1958

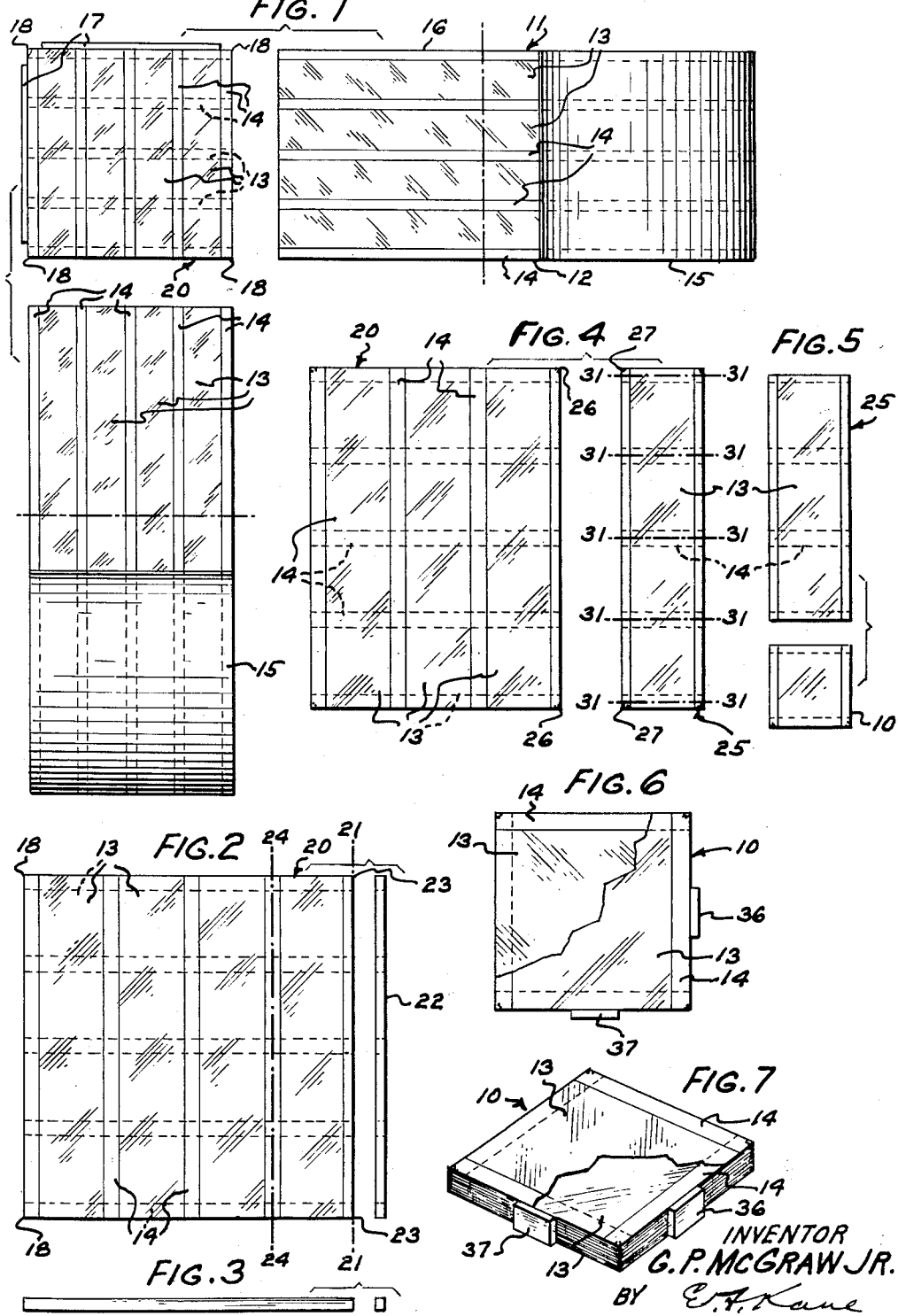

2,839,816

METHOD OF MAKING STACKED TYPE CAPACITORS

George P. McGraw, Jr., Downers Grove, Ill., assignor to Western Electric Company, Incorporated, New York, N. Y., a corporation of New York Application January 12, 1953, Serial No. 330,725

9 Claims. (Cl. 29—25.42)

This invention relates to the fabrication of capacitors and more particularly to a method of making capacitors of the stacked type from sheets of metallized dielectric.

It is an object of the present invention to provide an improved and economical method of making capacitors.

A feature of the present invention comprises arranging sheets of fusible dielectric with stripes of metal on them in a stack with the stripes of adjacent sheets at right angles one to another, fusing the corners of the stack to bond the sheets together, cutting through the stack along a marginal space between stripes on alternate sheets and again fusing the corners formed by the cutting, and repeating this operation until cuts have been made through all marginal spaces.

In accordance with one specific embodiment of the invention a plurality of stripes of metal are applied longitudinally to elongated webs of plastic dielectric in parallel and spaced relation to each other with bare margins along opposite edges of each stripe to form composite strips from which a predetermined number of square sheets are cut and arranged in a stack with the stripes of metal on adjacent sheets disposed at right angles to each other and with the stripes on alternate sets of sheets in superposed and aligned relation to each other, after which the corners of the stack of sheets are engaged with a heating tool to coalesce the corners of the plastic dielectric sheets and secure them together. The stack is then cut through along the middle of successive ones of the bare margins to subdivide the single original stack of sheets having a plurality of stripes on each sheet into a plurality of smaller stacks of sheets having a single stripe on each sheet to form individual capacitor units, and after each cutting of the stack of sheets into smaller sub-divisions the unbonded corners of the separated sub-divisions of the stack are coalesced to secure the sheets together. The individual capacitor units may then have molten metal sprayed onto two adjacent sides thereof to form terminals electrically connecting the two sets of alternate metal stripes respectively.

Other objects and advantages of the invention will become apparent by reference to the following detailed description and the accompanying drawings, illustrating a preferred embodiment thereof, in which Fig. 1 is a diagrammatic plan view showing a pair of composite strips and a stack of sheets cut therefrom;

Figs. 2 and 3 are plan and elevational views, respectively, of the completed stack of sheets, showing a waste edge portion thereof cut and separated therefrom;

Fig. 4 is a plan view of the stack showing a section thereof cut and separated from the remainder of the stack;

Fig. 5 is a view of one of the sections of the stack shown in Fig. 4 after it has been cut transversely to sever an individual capacitor unit therefrom;

Fig. 6 is an enlarged plan view of one capacitor unit showing the terminals applied to adjacent side edges thereof; and Fig. 7 is a view in perspective of one of the completed capacitor units.

The individual capacitor unit 10 (Fig. 7) is made from composite strips of metallized dielectric 11, which comprises a web 12 of plastic dielectric such as cellulose acetate or other plastic materials having a relatively high dielectric constant and capable of being fused under heat or by use of a solvent, onto which a plurality of metal stripes 13 is applied, as by being vaporized thereon. The metal bands 13, which preferably are of uniform width are arranged longitudinally of the web 12 and in parallel relation to each other and are spaced from each other and from the lateral edges of the web 12 to provide bare margins 14 of the dielectric web on opposite sides of the metal stripes. From the composite strips of metallized dielectric 11, which may be wound in rolls 15, sheets 16 are cut, preferably of a length equal to the width thereof. A predetermined number of the sheets 16 are arranged in a stack 17 with the stripes 13 on adjacent sheets arranged at right angles to each other.

To facilitate the stacking of the sheets 16, a pair of the rolls 15 may be arranged at right angles to each other as shown in Fig. 1, whereby the strips 11 may be unrolled therefrom, the sheets cut off and stacked alternately on a table in engagement with a pair of vertical walls 17. After a predetermined number of sheets 16 have been arranged in superposed relation to complete the stack 20 in which the metal stripes and bare margins in alternate sheets are arranged parallel to each other and in vertical alignment, and are disposed at right angles to the stripes and bare margins in the adjacent sheets, a heating tool is applied to the corners 18 thereof to fuse the corners of the dielectric material and bond the sheets together. While this is the preferred method of sealing the corners together, the application of a solvent such as acetone to cellulose acetate sheets would also effect the coalescing of the superposed sheets one to another.

The stack 20 (Figs. 1 and 2) is now ready to be sheared through longitudinally and transversely along the middle of the bare margins 14 to sub-divide it into a plurality of stacks of smaller sheets to form the individual capacitor units 10. As a first step, the composite stack of sheets 20 may be sheared along the middle of the first longitudinally extending bare margin 16 as indicated by the line 21—21 in Fig. 2 to trim the waste edge portion 22 from the stack, after which the free or unbonded corners 23 of the sheets in the stack are fused by the application of a heated tool thereto to coalesce and bond the sheets together.

The shearing of the stack may be accomplished with a thin cutting blade having a sharp edge, the blade being pressed through the stack against the edge of a backing member. It will be understood that as the blade is passed through the bare stripes disposed in one direction on one set of alternate sheets of the stack, it will cut through the transversely extending stripes on the other set of alternate sheets.

The stack may then be sheared along the middle of the next longitudinally extending bare margins 14 as indicated by the line 24—24 to separate from the stack 20, a section 25 thereof (Figs. 4 and 5) from which a plurality of individual capacitor units 10 will be formed. The unbonded corners 26 of the remaining part of the stack and the corners 27—27 of the section 25 are heated with a hot iron to coalesce the corners of the sheets. The remainder of the stack is then sheared along the middle of each of the longitudinally extending bare margins 14 to divide the stack into sections 25, and after each shearing action the loose or unbonded corners of the sheets of the remaining part of the stack and the section may be heated to bond the sheets together.

The sections 25 may then be transversely sheared along the middle of each of the bare margins 14 extending transversely of the section 25 as indicated by the lines 31—31 in Fig. 4 to trim the waste end portions therefrom and to form a plurality of individual capacitor units 10. After each transverse shearing action the loose corners of the sheets of each sub-division of the stack of sheets are heated to coalesce and bond the sheets together.

Each individual capacitor unit 10, as shown in Figs. 5 and 6, after being sheared from the adjacent unit of a section 25 and after having the last two of its unbonded corners heated to bond the corners of the sheets together, comprises a stack of small sheets of plastic dielectric, each with a metal stripe thereon which is spaced from one pair of opposed edges and extends to and between the other pair of opposed edges of the sheet and with the metal stripes of the adjacent sheets disposed at right angles to each other to form two sets of alternate stripes with the ends of each set disposed in separate sides of the capacitor unit and in spaced relation to each other. Molten metal is sprayed along a pair of adjacent side edges of the capacitor unit to form terminals 36—37 which connect the two sets of alternate metal stripes, respectively, of the capacitor unit.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A method of making capacitors from fusible sheets of dielectric, each having a plurality of stripes of metal thereon arranged in spaced relation to each other and the side edges of the sheets to form bare margins along the edges of the stripes, which comprises the steps of arranging a plurality of said sheets in a stack with the stripes of metal on adjacent sheets crossing each other at right angles and with the stripes on alternate sheets disposed in aligned and superposed relation one to another, fusing the four corners of the stack to bond the sheets together, successively cutting through the stack of sheets along the middle of each of the bare margins of the stack to sub-divide the stack into a plurality of smaller stacks of sheets with a single stripe on each sheet, and fusing the unbonded corners of the sub-divisions of said stack as they are formed after each cutting action.

2. A method of making capacitors from composite sheets of fusible dielectric having pluralities of stripes of conducting material thereon arranged in spaced relation to each other and the side edges of the sheets to form bare margins along the edges of the stripes, which comprises the steps of arranging a plurality of said sheets in a stack with the stripes of metal on adjacent sheets crossing each other at right angles and with the stripes on alternate sheets disposed in aligned and superposed relation one to another, heating the corners of said stack of sheets to bond the sheets together, successively shearing through the stack of sheets along the middle of each of the bare margins of the stack to progressively sub-divide the stack into a plurality of smaller stacks of sheets with a single stripe on each sheet, and heating the unbonded corners of the sub-divisions of said stack as they are formed after each shearing action to bond together the sheets thereof.

3. A method of making capacitors from composite sheets of fusible dielectric having pluralities of stripes of conducting material thereon arranged in spaced relation to each other and the side edges of the sheets to form bare margins along the edges of the stripes, which comprises the steps of arranging a plurality of said sheets in a stack with the stripes of metal on adjacent sheets crossing each other at right angles and with the stripes on alternate sheets disposed in aligned and superposed relation one to another, heating the corners of said stack of sheets to bond the sheets together, shearing through the stack of sheets along the middle of each of the bare margins of the stack to sub-divide the stack into a plurality of smaller stacks of sheets with a single stripe on each sheet, heating the unbonded corners of the sub-divisions of said stack after each shearing action to bond together the sheets thereof, and applying terminals to one pair of adjacent sides of each of the capacitor units.

4. A method of making capacitors from composite strips of fusible webs of dielectric having a plurality of stripes of conducting material deposited thereon in spaced relation to each other and the edges of the webs to form bare margins along opposite edges of the stripes, which comprises the steps of cutting substantially square sheets from said composite strips and arranging them in a stack with the stripes on adjacent sheets disposed at right angles to each other and with the stripes on alternate sheets disposed in aligned and superposed relation one to another, heating the corners of said stack to bond the sheets together, shearing the stack successively along the middle of each of the bare margins extending in one direction to form a plurality of sections of said stack, heating the unbonded corners of each section of the stack and the remainder of the stack as the sections are successively formed after each shearing action to bond together the sheets of the sections and the sheets of the remainder of the stack, transversely shearing each section along the middle of successive transversely disposed bare margins to form individual capacitor units, heating the unbonded corners of the individual capacitor units and the remainder of the section as they are formed after each transverse shearing operation of the sections to bond together the sheets thereof, and applying molten metal to one pair of adjacent side edges of each of the capacitor units to form terminals thereon.

5. A method of making capacitors from composite sheets of dielectric having a plurality of parallel stripes of conducting material thereon spaced from each other and the side edges of the sheets to provide bare margins along the edges of the stripes, which comprises the steps of arranging a plurality of said sheets in a stack with the stripes of conducting material on adjacent sheets disposed transversely of one another and with the stripes on alternate sheets disposed in aligned and superposed relation one to another, applying a solvent to the corners of said stack of sheets to bond the sheets together, shearing through the stack of sheets successively along the middle of each of the bare margins of the stack to sub-divide the stack into a plurality of capacitor units, and applying a solvent to the unbonded corners of the sub-divisions of said stack after each shearing action to bond together the sheets thereof.

6. A method of making capacitors from composite sheets of dielectric having a plurality of parallel stripes of conducting material thereon spaced from each other and the side edges of the sheets to provide bare margins along the edges of the stripes, which comprises the steps of arranging a plurality of said sheets in a stack with the stripes of conducting material on adjacent sheets crossing each other at right angles and with the stripes on alternate sheets disposed in aligned and superposed relation one to another, applying a solvent to the corners of said stack of sheets to bond the sheets together, shearing through the stack of sheets along the middle of successive ones of the bare margins of the stack and the components formed thereby to sub-divide the stack into a plurality of capacitor units with a single conducting stripe on each sheet, applying a solvent to the unbonded corners of the sub-divisions of said stack after each shearing action to bond together the sheets thereof, and applying terminals to one pair of adjacent sides of each of the capacitor units.

7. A method of making capacitors from fusible sheets of dielectric having parallel stripes of conducting material on one face thereof and with bare margins along the edges of the stripes which comprises arranging the sheets in a stack with the corners of the sheets in superposed alignment and with the stripes on adjacent sheets at right angles to each other and with the stripes on alternate sheets disposed in aligned and superposed relation to one another, fusing the four corners of the stack to bond together the sheets of the stack, shearing the stack of sheets along a margin to form two sub-divisions of the stack, fusing the unbonded corners of each sub-division, and repeating the steps of shearing each sub-division along the middle of a bare margin into smaller sub-divisions and fusing the unbonded corners of each smaller sub-division as formed until the stack of sheets has been sub-divided into capacitors.

8. A method of making capacitors, which comprises applying a plurality of stripes of conducting material to one side of an elongated web of fusible dielectric in parallel and spaced relation to each other and the edges of the webs to form a composite strip having bare margins on opposite sides of the stripes, cutting the composite strip transversely to form sheets, arranging the sheets in a stack with the corners of the sheets in superposed alignment and with the stripes on adjacent sheets disposed at right angles to each other and with the stripes on alternate sheets disposed in aligned and superposed relation to one another, fusing the four corners of the stack to bond the sheets of the stack together, shearing the stack of sheets along a margin to form two sub-divisions of the stack, fusing the unbonded corners of each sub-division to complete the bonding of the sheets thereof at the four corners, and repeating the steps of shearing each sub-division along the middle of a bare margin into smaller sub-divisions and fusing the unbonded corners of each smaller sub-division as formed to bond the sheets of each of said smaller sub-divisions at each of the four corners thereof until the stack of sheets has been subdivided into capacitors, the sheets of which each have a single stripe of conducting material thereon.

9. A method of making capacitors from sheets of dielectric, each sheet having a plurality of stripes of metal thereon arranged in spaced relation to each other and the side edges of the sheets to form bare margins along the edges of the stripes, which comprises the steps of arranging a plurality of said sheets in a stack with the corners of the sheets in superposed alignment and with the stripes of metal on adjacent sheets crossing each other at right angles and with the stripes on alternate sheets disposed in aligned and superposed relation to one another, coalescing the corners of the sheets of the stack, successively cutting through the stack of sheets along the middle of the bare margins of the stack to progressively sub-divide the stack into a plurality of smaller stacks of sheets with a single stripe on each sheet, and coalescing the unbonded corners of the sheets of the sub-divisions of the stack as they are formed after each cutting action.

References Cited in the file of this patent

UNITED STATES PATENTS 1,479,315  Pickard _____ Jan. 1, 1924

FOREIGN PATENTS 903,040  France _____ Sept. 21, 1945